G. A. LYON.
BUFFER ATTACHER.
APPLICATION FILED SEPT. 30, 1921. RENEWED MAY 15, 1922.
1,420,854.
Patented June 27, 1922.
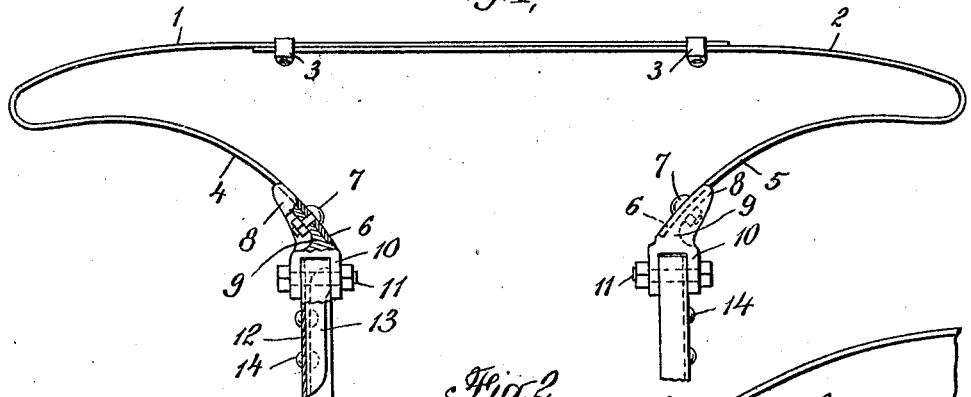
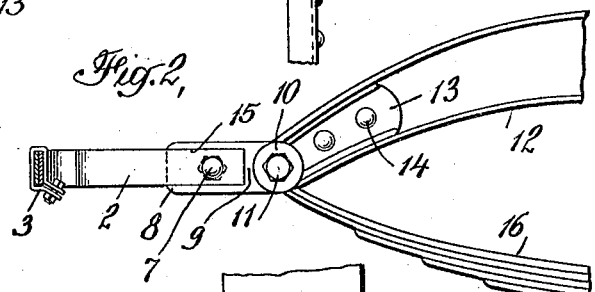
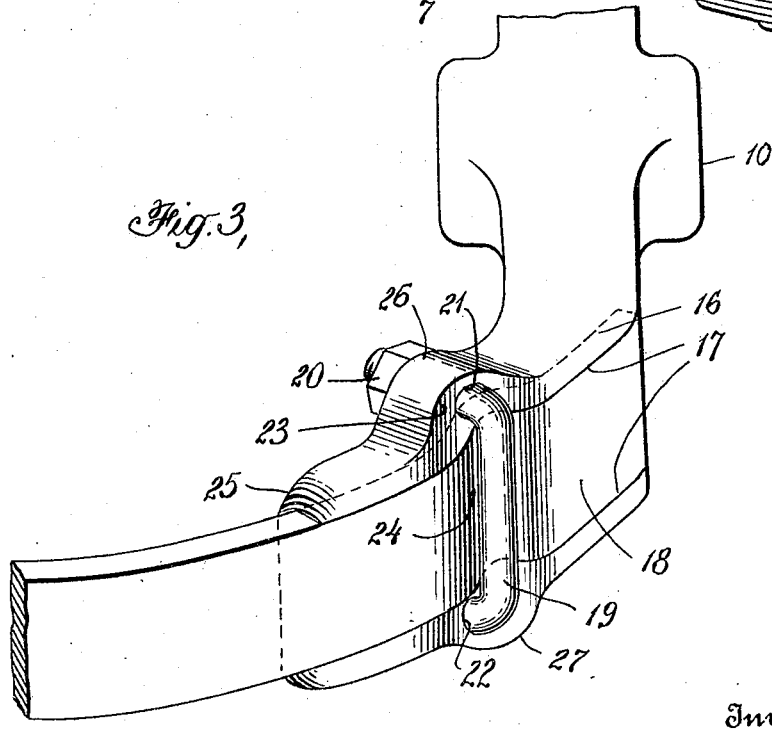
Inventor
George Albert Lyon
By his Attorney
Harry L. Duncan

UNITED STATES PATENT OFFICE.

GEORGE ALBERT LYON, OF PHILADELPHIA, PENNSYLVANIA.

BUFFER ATTACHER.

1,420,854.	Specification of Letters Patent.	Patented June 27, 1922.

Application filed September 30, 1921, Serial No. 504,397. Renewed May 15, 1922. Serial No. 561,165.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Buffer Attachers, of which the following is a specification, taken in connection with the accompanying drawing.

This invention relates especially to attaching devices for automobile buffers or bumpers and comprises integral or other rigidly connected brackets supported by the frame end members which are usually rigidly secured to the goose necks or forward ends of the channel frame members of the automobile to support the spring ends. By making these frame end members of such form and construction as to comprise a straight or diagonally inclined bracket which may be of suitable form to more or less enclose or accommodate the end of the buffer attaching member, bolts or other fastening devices can readily and securely connect these parts so as to make a strong and reliable support for the connected buffer front of resilient spring strip or other construction.

In the accompanying drawing showing in a somewhat diagrammatic way several illustrative embodiments of this invention—

Fig. 1 is a plan view showing one form of buffer attachment.

Fig. 2 is a sectional side view thereof and;

Fig. 3 is a perspective view showing a modified construction on a larger scale.

The automobile or other vehicle buffer or bumper may be of any desired form and construction, preferably comprising resilient strip attaching members, such as 4, 5 shown in Fig. 1. The buffer is there indicated as of the general Lyon spring strip type in which the attaching member 4 is integral with the end loop and impact receiving or front member 1. The other strip of tempered spring steel of which the buffer may be composed may comprise the front member 2 overlapping and reinforcing the member 1 and preferably adjustably secured thereto by the connecting devices or clips 3. This spring strip 2 has a similar integral end loop and attaching member 5, the attacher ends 6 of these members being brought inward in angular position if desired so as to cooperate with the similarly inclined supporting brackets secured to the vehicle frame members in any suitable way.

These supporting brackets may, as indicated in Fig. 2, be formed integral with the usual frame end member 10 of malleable cast iron or other suitable material which may have an integral securing portion 13 extending within the goose neck or frame member 12 and rigidly and permanently secured thereto, if desired, by the rivets 14. This frame end member 8 may be formed with the usual spring socket and hole for the spring bolt 11 to which the spring end is connected in the usual way. This supporting bracket, which may extend forwardly and outwardly from the goose neck, is thus rigidly supported therefrom and may be advantageously provided with an attacher socket 15 of such shape and size as to accommodate the attacher end 6, and may have a substantially square shoulder against which the extreme end of the attacher may abut or engage to positively limit its rearward movement. If desired, the rear face of this supporting bracket may be recessed adjacent the point 9 so as to accommodate the fastening device which may be in the form of a fastening bolt 7, extending through a suitable hole or slot in the attacher end and through the bracket, so as to securely hold these parts together; the initial curvature of the attacher end being preferably somewhat greater than the cooperating face of the socket therefor, so that as the bolt is tightened the attacher end may be flattened out slightly so as to come into bearing adjacent the bolt after its initial engagement with the ends of the socket. This forms a very simple, strong and effective buffer attaching device, which is of particular advantage where snubbers or shock absorbers are attached to the frame members adjacent these front springs.

Fig. 3 shows a modified construction in which a U-bolt fastening device may be used in connection with each of the supporting brackets of the same general construction, which may be integral with, or securely connected with the frame end members of the automobile. This supporting bracket 16 may be forwardly and outwardly curved toward its rounded end 25 and may be formed with lugs or projections 26, 27 on its upper and lower sides so as to amply support the U-bolt fastening device in holes 21 formed in these lugs. This bracket may be formed with a socket 17 to accommodate the attacher end 18 of spring steel strip or other material, integral with, or suitably connected to the buffer front. In some cases it is desirable to form a retaining recess or depression such as 24 in this attacher end so that the corresponding U-bolt can engage this recess and by this interlocking action definitely prevent the attacher working forward, even though it is not formed with any holes or slots which, of course, necessarily decrease its strength. In this form of construction the buffer of the Lyon spring strip type, for example, may have the attacher ends inserted in the sockets in these supporting brackets, into which they may be drawn and securely held when the nuts 20 are set home on the U-bolt.

This invention has been described in connection with a number of embodiments, forms, proportions, parts, arrangements, materials, methods of manufacture, connection and use, to the details of which disclosure the invention is not of course to be limited, since what is claimed as new and what is desired be secured by Letters Patent is set forth in the appended claims:

1. The automobile buffer comprising a spring strip resilient buffer front portion and integral end loops and attaching members each having its end bent inwardly and rearwardly to form substantially square ended attacher ends, a transverse retaining recess in said attacher end, frame end members rigidly and permanently secured to the ends of the channel iron frame members of the vehicle and each having an integral outwardly and forwardly flaring supporting bracket formed with an attacher socket to substantially fit and accommodate the attacher end, holes in said bracket adjacent said socket and a U-bolt fastening device in said holes to substantially engage said retaining recess and rigidly and securely hold said attacher end in said socket.

2. The automobile buffer comprising a spring strip resilient buffer front portion and integral end loops and attaching members each having its end bent inwardly and rearwardly to form attacher ends, a retaining recess in said attacher end, frame end members rigidly and permanently secured to the ends of the channel iron frame members of the vehicle and each having an integral outwardly and forwardly flaring supporting bracket formed with an attacher socket to accommodate the attacher end, holes in said bracket and a fastening device in said holes to substantially engage said retaining recess and rigidly and securely hold said attacher end in said socket.

3. The automobile buffer comprising a buffer front portion and connected resilient attaching members each having its end bent inwardly and rearwardly to form substantially square ended attacher ends, frame end members secured to the ends of the channel iron frame members of the vehicle and having a spring connection and an integral supporting bracket formed with an attacher socket to accommodate the attacher end and having a shoulder to co-operate with the square attacher end, holes in said bracket and fastening devices in said holes to rigidly and securely hold said attacher end in said socket.

4. The automobile buffer comprising a buffer front portion and connected resilient attaching members each having its end bent to form attacher ends, frame end members secured to the ends of the channel iron frame members of the vehicle and having a spring connection and an integral supporting bracket formed with an attacher socket to accommodate the attacher end and having a shoulder to co-operate with the attacher end.

5. The automobile buffer comprising a front portion and connected attaching members each having substantially square ended attacher ends, a retaining device in said attacher end, frame end members adapted to be secured to the frame members of the vehicle and having an integral supporting bracket formed with an attacher socket to accommodate the attacher end and, U-bolt fastening devices to substantially rigidly and securely hold said attacher ends in said sockets.

6. The automobile buffer comprising a front portion and connected attaching members each having attacher ends, frame end members adapted to be secured to the frame members of the vehicle and having an integral supporting bracket formed with an attacher socket to accommodate the attacher end and fastening devices to substantially rigidly and securely hold said attacher ends in said sockets.

7. The automobile buffer comprising a buffer front portion and connected resilient attaching members each having bent attacher ends, end members rigidly and permanently secured to the ends of the frame members of the vehicle and having a supporting bracket formed with an attacher socket to accommodate the attacher end and relatively less bent in its co-operating face and a fastening device to co-operate with a central portion of said attacher end and force it against the co-operating face of said attacher socket.

8. The automobile buffer comprising a buffer front portion and connected resilient attaching members each having attacher ends, end members secured to the ends of the frame members of the vehicle and having a supporting bracket with an attacher supporting portion to accommodate the attacher end and relatively less bent in its co-operating face and a fastening device to co-operate with a central portion of said attacher end and force it against the co-operating face of said attacher supporting portion.

9. The automobile buffer attaching device comprising frame end members rigidly and permanently secured to the ends of the channel iron frame members of the automobile and each having adjacent its spring bolt connection a forwardly and outwardly flaring supporting bracket formed with a socket adapted to accommodate the spring strip attacher end of the buffer and U-bolt fastening devices passing through projecting lugs in said bracket and adapted to engage the attacher end and securely hold it in said socket.

10. The automobile buffer attaching device comprising frame end members secured to the ends of the channel iron frame members of the automobile and each having adjacent its spring bolt connection a supporting bracket formed with a socket adapted to accommodate the attacher end of the buffer and U-bolt fastening devices passing through said bracket and adapted to engage the attacher end and securely hold it in said socket.

11. The automobile buffer attaching device comprising frame end members adapted to be rigidly and permanently secured to the ends of the channel iron frame members of the automobile and each having adjacent its spring connection a supporting bracket formed with a socket adapted to accommodate the attacher end of the buffer and fastening devices co-operating with the attacher end to securely hold it in said socket.

12. The automobile buffer attaching devices comprising frame end members secured to the ends of the frame members of the automobile and each having a supporting bracket formed with a socket adapted to accommodate the attacher end of the buffer and fastening devices co-operating with the attacher end to securely hold it in said socket.

13. The automobile buffer attaching device comprising frame end members rigidly secured to the ends of the frame members of the automobile and each having adjacent its spring connection a forwardly and outwardly bent supporting bracket adapted to co-operate with the spring strip attacher of the buffer and fastening devices passing through said bracket and adapted to engage the attacher and securely hold it to said bracket.

14. The automobile buffer attaching device comprising frame end members rigidly secured to the ends of the frame members of the automobile and each having adjacent its spring connection a supporting bracket adapted to co-operate with the attacher of the buffer and fastening devices passing through said bracket and adapted to engage the attacher and securely hold it to said bracket.

GEORGE ALBERT LYON.